May 20, 1930.   H. E. BRUNNER ET AL   1,759,640
SHEET METAL ADAPTER
Filed June 13, 1929
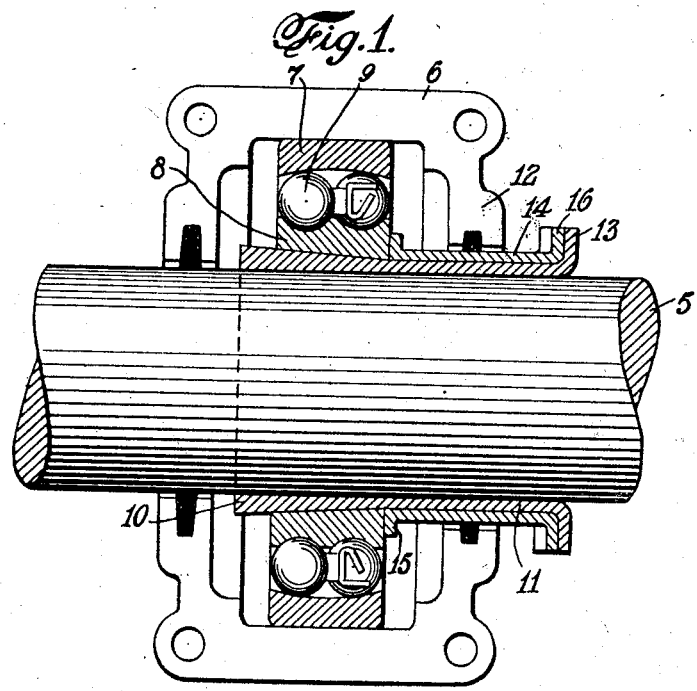
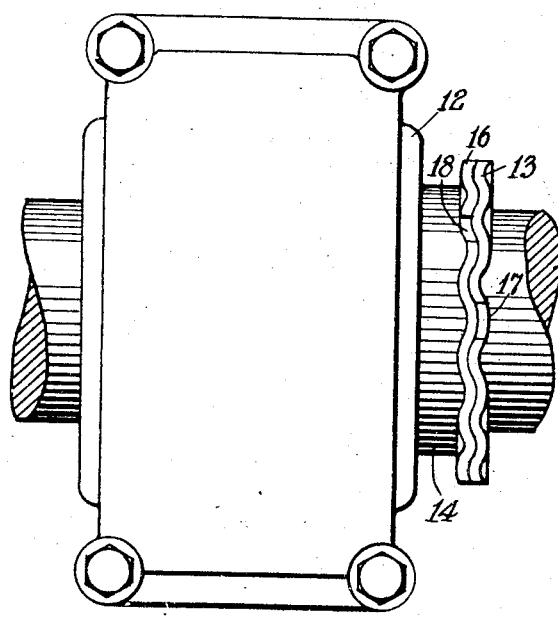
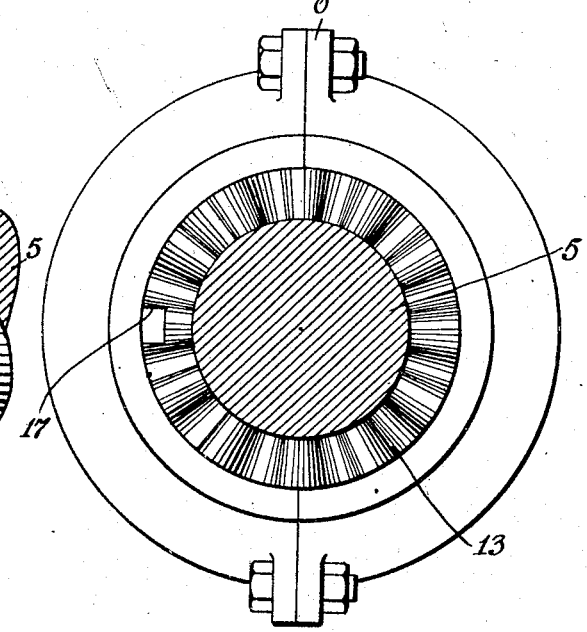
INVENTORS
HAROLD E. BRUNNER AND
BY  ROBERT F. RUNGE
ATTORNEY Patented May 20, 1930

1,759,640

UNITED STATES PATENT OFFICE

HAROLD E. BRUNNER, OF LARCHMONT, AND ROBERT F. RUNGE, OF FOREST HILLS GARDENS, NEW YORK, ASSIGNORS TO THE SKAYEF BALL BEARING COMPANY, OF HARTFORD, CONNECTICUT, A CORPORATION OF CONNECTICUT

SHEET-METAL ADAPTER

Application filed June 13, 1929. Serial No. 370,558.

The object of this invention is to furnish a secure and economical device for mounting bearings on shafts and other journals, and one which is particularly useful in mounting bearings on long shafts such as line shafts, upon which the bearing has to be moved for some considerable distance upon the shaft to bring it to its proper position. This invention also permits the bearing mounting device and the bearing to be placed in a hanger box and handled as a unit and mounted on the shaft as a unit if desired.

The invention also relates to means for readily seating a bearing on an adapter sleeve and for locking the parts in the seated position.

Another object of the invention is to afford an adapter sleeve and locking device made up of sheet metal parts.

And a still further object of the invention is to furnish an adapter sleeve much thinner than has heretofore been employed in standard practice and also a sleeve of less taper angle than is now employed in standard practice.

According to standard practice the bore of the inner ring of the bearing is tapered at an angle of about two degrees, twenty-four minutes, and the adapter sleeve is made of solid metal and has considerable thickness because of the fact that the screw threads for the locking nut must be cut into an extension from the thin end of the sleeve. In order not to unduly weaken the inner ring of the bearing in thus tapering its inner surface, and to accommodate the thick adapter sleeve, it has been the practice in line shaft hangers to use a bearing frequently considerably larger than is necessary to support the load.

For our improved device a smaller sized bearing may be used than in prevailing practice, and the bearing is securely and permanently locked in position. The saving to the ultimate user of the bearings is quite great especially in installations requiring a large number of bearings, say for instance line shaft hangers in a factory. The bearing itself will be cheaper and we believe that our improved type of adapter can be furnished at a much less price to the consumer than those now in use.

In the drawings accompanying this specification a form of our invention is illustrated which may be the preferred form, in which drawings—

Figure 1 is a top view of the cover of a shaft hanger box and an elevation of a broken away section of a portion of line shafting. A bearing in longitudinal section is illustrated as being located in the box and mounted on the shaft by means of a form of our invention, which is also shown in longitudinal section.

Fig. 2 is an under side view of the parts illustrated in Figure 1, and

Fig. 3 is an end view looking at Fig. 2 from the right-hand side.

In the illustrative embodiment of our invention shown in the drawings a section of line shaft 5 is shown mounted in a hanger box, the removable cap 6 of which is shown. Mounted within this hanger box is a bearing having an outer ring 7 adapted to have a certain amount of free lateral play in the box, and an inner ring 8 which is intended to be firmly mounted upon the shaft 5. These rings are shown held together by means of suitable rolling elements 9. The bore of the inner ring 8 is shown tapering.

The parts above described are selected as standard parts with which our intention is adapted for use.

Our improved mounting comprises two parts made of sheet metal. One of these parts is a sleeve adapted to fit upon the shaft and to slide thereon until locked. This sleeve has a tapered adapter portion 10 which is preferably split to facilitate clamping. This split tapered portion constitutes a bearing seat and is tapered to conform to the taper of the bore of the inner ring 8 of the bearing. The sleeve extends from the smaller end of the tapered seat passing along the shaft at 11 and beyond the end wall 12 of the housing. The extreme end of this extension of the sleeve is shown turned outwardly constituting a flange 13 which is sinuous or corrugated, the waves forming opposite curved surfaces which act as cam faces for the locking collar presently to be described.

Outwardly of the extension 11 of the sleeve there is mounted a locking collar 14. The collar is mounted to be capable of relative longitudinal and rotary movement upon the sleeve, its inner end being formed with a flange 15 for engaging the inner ring of the bearing, and its outer end with a flange 16 formed with cam faces corresponding with the cam faces of the flange 13.

The cams 13 and 16 are provided with suitable spanner engaging openings, these being indicated in the drawings by the reference characters 17 and 18.

Generally in practice enough clearance will be permitted by the contraction of this tapered seat portion 10 for permitting the mounting of the bearing on the seat portion from the larger end when no shaft is within the sleeve. The parts are so proportioned that when the bearing is mounted on the seat portion of the sleeve the bearing and the entire mounting member may be freely threaded upon the shaft until the bearing has reached its position, and then by the application of a pair of spanners to the openings 17 and 18 and turning these in opposite directions, the cam faces cause the seat portion 10 to be drawn within the bore of the bearing or relative movement which accomplishes the same result, and with the camming movement in the proper direction in relation to the relative rotation of the shaft in respect of the box, the parts are held in locked position.

If by any mischance the locking movement should be effected in the wrong direction and the parts come loose due to this oversight of the millwright, continued effort of the inner ring to rotate upon the sleeve and against the locking collar will cause the correct camming action, and in a very short time jamming of the cams, so that an effectual locking is afforded.

The bearing may be mounted upon the seat of the sleeve and the bearing and sleeve placed within the housing, the parts greased and sent to the consumer, so that the parts will not need to be opened until the time of application arrives. And in many applications the box may be properly installed and the shaft mounted in it, and the mounting locked upon the shaft without the necessity of the millwright in any way opening the box.

Having thus described our invention, we claim and desire to secure by Letters Patent:

1. An adapter for use in mounting a bearing on a shaft and comprising a sleeve for embracing the shaft and having a split bearing seat portion at one end tapering toward the center, the other end of the sleeve having a waved outwardly directed flange and a collar rotatably mounted on the sleeve, and having a mating waved flange at one end, the other end having a bearing engaging flange.

2. A sheet metal adapter for use in mounting a bearing on a shaft comprising a sleeve for embracing a shaft and having a split tapered bearing seat portion at one end tapering toward the center, the other end of the sleeve having an upturned flange corrugated for forming cam faces and a collar rotatably mounted on the sleeve, and having a mating corrugated cam face flange, the other end of said collar lying adjacent the tapered bearing seat and having a flange for engaging a bearing thereon.

3. An adapter for use in mounting a bearing on a shaft and comprising a sleeve for embracing the shaft and having a split bearing seat portion at one end tapering toward the center, the other end of the sleeve having a waved outwardly directed flange and a collar rotatably mounted on the sleeve, and having a mating waved flange at one end, the other end having a bearing engaging flange, spanner engaging sockets being formed in the mating waved flanges.

Signed at New York, N. Y., this 12th day of June, 1929.

ROBERT F. RUNGE.
HAROLD E. BRUNNER.